(12) United States Patent
Lerouge

(10) Patent No.: US 12,404,103 B1
(45) Date of Patent: Sep. 2, 2025

(54) AUTOMATED ITEM STORAGE AND RECOVERY SYSTEM

(71) Applicant: Exotec Product France, Croix (FR)

(72) Inventor: Alexis Lerouge, Hellemmes-Lille (FR)

(73) Assignee: Exotec Product France, Croix (FR)

( * ) Notice: Subject to any disclaimer, the term of this patent is extended or adjusted under 35 U.S.C. 154(b) by 0 days.

(21) Appl. No.: 18/958,331

(22) Filed: Nov. 25, 2024

(51) Int. Cl.
*B65G 1/04* (2006.01)
*B65G 1/06* (2006.01)
*B65G 1/10* (2006.01)

(52) U.S. Cl.
CPC .......... *B65G 1/0492* (2013.01); *B65G 1/065* (2013.01); *B65G 1/10* (2013.01)

(58) Field of Classification Search
None
See application file for complete search history.

(56) References Cited

U.S. PATENT DOCUMENTS

| | | | | |
|---|---|---|---|---|
| 6,805,526 | B2 * | 10/2004 | Stefani | B65G 1/04 414/280 |
| 11,254,504 | B2 * | 2/2022 | Stevens | B25J 9/1687 |
| 11,554,917 | B2 * | 1/2023 | Stevens | G05D 1/0297 |

FOREIGN PATENT DOCUMENTS

| | | |
|---|---|---|
| DE | 1963043 A1 | 6/1971 |
| JP | H01289760 A | 11/1989 |
| JP | 2014151997 A | 8/2014 |
| WO | 2021030705 A1 | 2/2021 |

OTHER PUBLICATIONS

Search Report issued on May 9, 2025, in corresponding French Application No. 2412912, 21 pages.

* cited by examiner

*Primary Examiner* — Mark C Hageman
(74) *Attorney, Agent, or Firm* — Maier & Maier, PLLC

(57) ABSTRACT

An automated article storage and retrieval system that makes use of one or more vehicles, each of which has an engine, a main set of ground rollers for moving the vehicle on a drive surface, a transfer mechanism for loading a receptacle onto the vehicle and/or unloading a receptacle from the vehicle, a clutch mechanism having an engaged configuration and a disengaged configuration for engaging and disengaging a power transmission from the engine to the transfer mechanism, with the clutch mechanism having a disengaged configuration and an engaged configuration for engaging and disengaging a power transmission from the engine to the transfer mechanism, one or more actuating devices motorised at the running surface, which can cooperate with one of said one or more vehicles in order to switch the clutch mechanism between the engaged configuration and the disengaged configuration.

20 Claims, 6 Drawing Sheets

AUTOMATED ITEM STORAGE AND RECOVERY SYSTEM

FIELD

This description relates to an automated article storage and retrieval system and to a method of storing and/or preparing an order by means of such an automated article storage and retrieval system.

BACKGROUND

In the field of logistics, storage racks are used in warehouses. A storage rack in a warehouse typically takes the form of a vertical structure formed by a set of vertical uprights, often in the form of vertical metal sections.

In warehouses, these storage racks are designed to receive and store items, which are then put together to form orders; these orders are then sent to an end customer by road, rail or any other means, or taken from the warehouse to be collected directly by the end customer at a "drive".

Within their structure, storage racks define storage locations, also known as compartments. These compartments are designed to hold containers, or more generally receptacles, in which items are placed and stored.

Such storage racks can be served by a transport system having automatically guided vehicles configured to pick up and deposit items in said storage racks. Such storage systems are known as "ASRS" or Automated Storage and Retrieval Systems. Automatic guided vehicles (AGVs) are robots that move autonomously without human intervention. Document WO 2021/030705 describes an example of such a vehicle.

The vehicles can move in at least one or both directions along a horizontal surface, which can typically be the warehouse floor. Self-guiding vehicles can also move vertically over storage racks. The vehicles are configured to pick receptacles containing products or items, from the storage racks, and transport them to another location typically another storage location or to an order picking station where said items are gathered together, typically so as to form an order for a final customer.

Such vehicles may have a chassis that is able to climb up the storage racks. For example, such vehicles may have motorised toothed wheels which are configured to mesh with the teeth of a rack bar extending along the uprights of the storage racks. In this way, the vehicles may be able to roll and climb, making them capable of moving in three dimensions. In addition to the two flat dimensions generally associated with the ground on which the vehicles move, there is a third vertical dimension associated with the storage racks on which the vehicles can move up and down.

To load or unload a receptacle, the vehicle may be able to move a receptacle between the vehicle and a storage location. In WO 2021/030705, the transfer mechanism uses two endless conveyors, such as chains, with spindles mounted on them. These chains are driven by a motor to move the spindles to or from the storage locations. As a vehicle approaches a bin to pick up a receptacle, the chains move the spindles under a groove in the bin. The vehicle lifts slightly to engage the spindles in the grooves, then the chains reverse their movement to pull the bin onto the vehicle. To unload an item, the process is reversed.

In order to limit the weight and volume of vehicles, it is known to use the same motor for several functions. For example, in document WO 2021/030705, driving and transfer are performed by the same motor. To this end, document WO 2021/030705 describes a clutch mechanism for engaging and disengaging the transmission of power from the engine to the vehicle transfer mechanism. More specifically, the clutch mechanism is composed of two symmetrical clutch sub-assemblies, each having a pivoting support.

When the vehicle is on the ground, the pivoting support of each sub-assembly keeps the transfer mechanism disengaged from the engine power transmission, which means that the engine only drives the vehicle along the ground. On the other hand, when the vehicle is lifted during a vertical movement by climbing, the pivoting support of each sub-assembly changes position under the effect of its own weight or of a spring, thus engaging the transfer mechanism with the power transmission. This enables the motor to drive the transfer mechanism to load or unload a receptacle.

So, depending whether the vehicle is positioned on the ground or whether it has been lifted by climbing, the clutch mechanism can switch between driving only the ground drive components and simultaneously driving the ground drive components and the transfer mechanism.

Consequently, the components used to drive the vehicle on the ground are always engaged with the power transmission. However, the disadvantage of this type of clutch mechanism is that it does not allow transfer to be activated when the vehicle is on the ground without causing the vehicle to move horizontally as a result.

This limitation leads to significant inefficiencies in the process of loading and unloading items. Indeed, the inability to have the vehicle independently perform transfer or rolling forces the vehicles to perform additional movements, in this case vertical movement along the uprights of a rack via climbing, thus increasing cycle time and reducing overall productivity. In turn, this constraint can lead to premature wear of mechanical components, increasing maintenance costs and reducing equipment life. It is therefore crucial to develop solutions that enable more flexible and efficient management of operations, in order to optimise warehouse operations and meet the growing demands of the logistics sector.

SUMMARY

An automated article storage and retrieval system is proposed having at least one rolling surface and one or more vehicles each having:
  at least one engine,
  ground rollers configured to be driven by the engine to move the vehicle over the rolling surface,
  a transfer mechanism configured to load a receptacle onto the vehicle and/or unload a receptacle from the vehicle,
  a clutch mechanism having an engaged configuration in which the clutch mechanism engages a transmission of power from the engine to the transfer mechanism, a clutch mechanism having an engaged configuration in which the clutch mechanism engages a transmission of power from the engine to the transfer mechanism, and a disengaged configuration in which the clutch mechanism disengages the transmission of power from the engine to the transfer mechanism,
the automated article storage and retrieval system being characterised in that it has one or more powered actuators at the driving surface, each actuator being configured to cooperate with one of said one or more vehicles to move the clutch mechanism between the engaged configuration and the disengaged configuration.

Each vehicle may have a chassis, the clutch mechanism having a bracket mounted on the chassis for movement between a first position in the disengaged configuration and a second position in the engaged configuration.

Each actuator can be configured to cause a displacement of the support of one of said one or more vehicles between the first position and the second position in order to move the clutch mechanism between the engaged configuration and the disengaged configuration.

The support can be mounted so as to pivot relative to the chassis about a pivot axis, which preferably extends in a transverse direction of the vehicle.

The main ground rollers of each vehicle can be mounted on the support, so that the main ground rollers are movable relative to the chassis between a raised position coinciding with the first position of the support and a lowered position coinciding with the second position of the support.

Each actuating device can be configured to cause the support to move between the first position and the second position by moving the main ground rollers between the raised position and the lowered position.

The main ground rollers of each vehicle can be held in their raised position when the vehicle is fully supported by the rolling surface via the main ground rollers.

Each actuating device can be configured to eliminate support of the vehicle by the main ground rollers and allow the main ground rollers to be moved into their lowered position at least under their own weight.

The clutch mechanism of each vehicle may have a biasing member configured to bias the support to the second position and/or the main ground rollers to the lower position when the support of the vehicle by the main ground rollers is removed by one of said one or more actuating devices.

Each actuating device may have a sensor configured to detect the presence in the vicinity of one of said one or more vehicles, in particular to detect the presence in the vicinity of a vehicle capable of cooperating with the actuating device.

Each actuating device may have a platform received in a respective recess in the running surface, the platform being movable relative to the running surface between:
  a raised position in which the platform is flush with the running surface and adapted to hold the main ground rollers of one of said one or more vehicles in the raised position, and
  a lowered position in which the main ground rollers of one of said one or more vehicles can be wholly or partly inserted into the associated recess by displacement into its lowered position from the raised position.

Each actuator may have an actuator configured to move the platform at least from the raised position to the lowered position, and preferably from the lowered position to the raised position.

Each actuator may have a biasing member configured to exert a biasing force on the platform towards the raised position.

The sensor can be configured to detect the presence in the vicinity of one of said one or more vehicles, the main ground rollers of which are vertically above the platform.

Each vehicle may have secondary ground rollers having one or more secondary wheels configured to roll on the rolling surface.

Each actuation device may have one or more rolling zones, each configured to allow rotation of one of said one or more secondary wheels, without moving the vehicle relative to the rolling surface.

Each actuator may be configured to raise the chassis of one of said one or more vehicles to remove support for the vehicle by the main ground rollers to allow movement of the main ground rollers to its lowered position.

The transfer mechanism may have a first driven gear and the power transmission has a driving gear rotatably mounted on the clutch mechanism carrier.

In the first position of the support, the driving gear can be at a distance from the first driven gear, and in the second position of the support, the driving gear meshes with the first driven gear.

The automated article storage and retrieval system may have at least one storage rack each having a plurality of uprights aligned in a first horizontal direction and defining a column between each pair of consecutive uprights, each column having at least one lower level which includes a storage location adapted to receive a receptacle.

One of said one or more actuators may be arranged at at least one of the columns, and preferably at each of the columns, of the rack to transfer the clutch mechanism of one of said one or more vehicles from the disengaged configuration to the engaged configuration and load a receptacle onto the vehicle from the lower level of the column and/or unload a receptacle from the vehicle into the lower level of the column, via the transfer mechanism.

The automated article storage and retrieval system may have several storage racks spaced apart in a second horizontal direction, preferably perpendicular to the first horizontal direction, and having a plurality of aisles extending in the first horizontal direction between each pair of consecutive racks, the rolling surface having each of the aisles.

Each actuating device associated with a column can be arranged at the level of the aisle serving said column, and preferably arranged opposite the column in the second horizontal direction.

The automated article storage and retrieval system may have at least one conveyor accessible by said one or more vehicles travelling on the rolling surface.

At least one of said one or more actuators is arranged in proximity to the conveyor to shift the clutch mechanism of one of said one or more vehicles from the disengaged configuration to the engaged configuration in order to load a receptacle onto the vehicle from the conveyor and/or unload a receptacle from the vehicle onto the conveyor, via the vehicle transfer mechanism.

According to another aspect, there is proposed a method of storage and/or order picking by means of an automated article storage and retrieval system as described above, which may include steps of:
  Moving one of said one or more vehicles over the rolling surface by means of the main motor-driven ground rollers to a transfer zone, the transfer zone having one of said one or more actuating devices, the mechanism being in the disengaged configuration during movement of the vehicle,
  Bringing the vehicle into co-operation with the actuating device,
  loading a receptacle onto the vehicle from the transfer zone by means of the engine-driven transfer mechanism, and/or unloading a receptacle from the vehicle to the transfer zone by means of the engine-driven transfer mechanism.

Actuation of the actuation device may include moving the platform from the raised position to the lowered position to cause the main ground rollers to move to its lowered position in the associated recess in the rolling surface.

Actuation of the actuation device may involve raising the vehicle relative to the driving surface to allow the main ground rollers to be moved into their lowered position.

BRIEF DESCRIPTION OF THE DRAWINGS

Further features, details and advantages will become apparent from the detailed description below and from an analysis of the attached drawings, in which.

DETAILED DESCRIPTION

Figure 1:
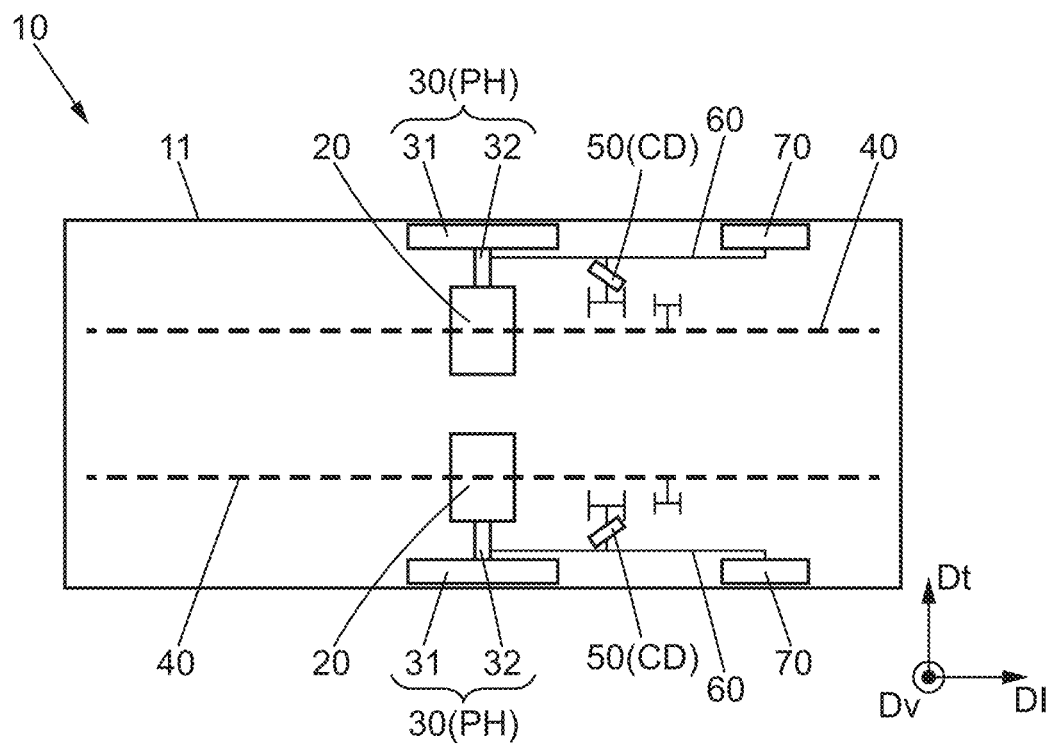
FIG. 1 represents a schematic top view of a vehicle for an automated article storage and retrieval system according to an exemplary embodiment, in which a clutch mechanism engages transfer mechanism with a power transmission of an engine intended for driving.

An automated article storage and retrieval system is now described with reference to FIGS. 1 to 8.

The automated item storage and retrieval system firstly may have at least one rolling surface 200. The rolling surface 200 may have the surface of a floor, for example in a warehouse.

The automated article storage and retrieval system also may have one or more vehicles 10. An example of a vehicle is shown schematically in FIGS. 1 and 2. Each vehicle may have at least one motor 20. The motor 20 of each vehicle 10 may be electrically powered. To this end, each vehicle 10 may have at least one battery.

Each vehicle further may have main ground rollers 30 configured to be driven by the motor 20 in order to move the vehicle 10 over the rolling surface 200. The main ground rollers 30 can advantageously be configured to allow the vehicle 10 to move on the rolling surface in the open field, i.e. in the absence of rails or any other mechanical guidance that requires structural cooperation with the vehicle 10. The vehicle 10 can be automatically guided, i.e. of the "automated guided vehicle" or AGV type. To this end, the vehicle 10 may have on-board guidance adapted to automatically guide the vehicle 10.

Each vehicle 10 may have a transfer mechanism 40 configured to load a receptacle onto the vehicle 10 and/or unload a receptacle from the vehicle 10. The receptacle can be moved along a transfer axis At in a first direction S1 (visible in FIG. 8) to be loaded onto the vehicle 10 and/or in a second direction S2 (opposite to the first direction S1) to be unloaded from the vehicle 10.

Each vehicle 10 further may have a clutch mechanism 50 having an engaged configuration CE in which the clutch mechanism 50 engages a power transmission 60 from the engine 20 to the transfer mechanism 40, and a disengaged configuration CD in which the clutch mechanism 50 disengages the power transmission 60 from the engine 20 to the transfer mechanism 40.

Remarkably, the automated article storage and retrieval system may have one or more motorised actuator devices 100 at the rolling surface 200, each actuator device 100 being configured to co-operate with one of said one or more vehicles 10 to shift the clutch mechanism 50 from the engaged configuration CE to the disengaged configuration CD.

The integration of an actuating device 100 at the running surface 200 makes it possible to switch the clutch mechanism 50 between the engaged CE and disengaged configurations without requiring vertical movement of the vehicle 10 using the vehicle 10's own climbing mechanism (such climbing mechanisms are described in more detail below). This also enables a receptacle to be loaded and/or unloaded with the vehicle at the running surface. This optimises cycle time by allowing faster loading and unloading of receptacles, thereby improving the operational efficiency of the system. The clutch mechanism 50 allows a single motor 20 to be used for both the rolling and transfer functions. This reduces manufacturing and maintenance costs, while increasing system reliability. The use of actuators 100 eliminates the need for dedicated transfer stations or heavy exchange machines, for example, the system can be flexibly integrated into a variety of warehouse environments, maximising the use of available space and reducing installation constraints.

An actuation device 100 can cooperate successively with several vehicles. This capacity for centralised management of the vehicle clutch mechanism avoids the need to integrate a specific actuator for the clutch mechanism individually on each vehicle. By centralising actuation of the clutch mechanism at the actuator, the system reduces vehicle manufacturing and maintenance costs. Otherwise, each vehicle would require an additional actuator/motor to operate the clutch mechanism. What's more, this centralised approach means that vehicles are lighter, more economical and also more reliable.

Each actuation device 100 may be structurally independent of said one or more vehicles 10. Also, each actuating device 100 may be fixedly connected to the running surface 200. Each actuating device 100 may be anchored (i.e. structurally fixed) in the running surface 200. For this purpose, one or more of the following techniques may be used: expansion bolt anchoring, chemical anchoring, grouting anchoring, dowel anchoring, base plate anchoring (i.e. use of metal plates fixed to the ground with bolts or screws, on which structures can be mounted), pile anchoring, foundation screw anchoring, nail anchoring. These techniques can be used alone or in combination, depending on the specific requirements of the application and the ground conditions.

In addition, each vehicle 10 may have a chassis 11. The chassis 11 may extend in a longitudinal direction Dl and a transverse direction Dt. In standard use of the vehicle 10, the longitudinal direction Dl and/or the transverse direction Dt may each be horizontal or close to horizontal. Thus, the longitudinal direction Dl and/or the transverse direction Dt may be perpendicular to a vertical direction Dv. The transverse direction Dt may be perpendicular to the longitudinal direction Dl. In the following description, when reference is made to absolute position qualifiers, such as the terms "front", "back", "top", "bottom", "left", "right", etc., or relative position qualifiers, such as the terms "top", "bottom", "upper", "lower", etc., or to position qualifiers, such as the terms "front", "back", "top", "bottom", "left", "right", etc, or orientation qualifiers, such as "horizontal", "vertical", etc., reference is made, unless otherwise specified, to the orientation of the figures or of the vehicle 10 in its normal position of use or of the article storage and retrieval system.

The vehicle chassis may be able to support the transfer mechanism. The vehicle chassis 10 may also be able to receive and carry a receptacle.

More particularly visible in FIGS. 4 to 7, the clutch mechanism 50 may have a support 51 mounted on the chassis 11 so as to be movable between a first position P1 in the disengaged configuration CD and a second position P2 in the engaged configuration CE. Each actuator device 100 may be configured to cause a displacement of the support 51 of one of said one or more vehicles 10 between the first position P1 and the second position P2 in order to move the clutch mechanism 50 between the engaged configuration CE and the disengaged configuration CD. The first and second positions of the support 51 may be considered in relation to the chassis 11 of the vehicle 10, or alternatively in relation to the running surface 200.

The support 51 can be mounted so as to pivot relative to the chassis 11 about a pivot axis Ap, which preferably extends in a transverse direction Dt of the vehicle 10. The first and second positions of the support 51 may respectively coincide with a first orientation and a second orientation of the support 51 with respect to the chassis 11 of the vehicle 10, or with respect to the driving surface 200.

The main ground rollers 30 can be moved relative to the chassis 11 between a high position PH which coincides with the first position P1 of the support 51 and a low position PB which coincides with the second position P2 of the support 51. To do this, the main ground rollers 30 of each vehicle 10 may be mounted on the support 51. The main ground rollers 30 can be rotated relative to the chassis 11 about the pivot axis Ap.

Each actuation device 100 can be configured to cause a displacement of the support 51 between the first position P1 and the second position P2 by means of a displacement of the main ground rollers 30 between the high position PH and the low position PB.

More particularly, the main ground rollers 30 may have a drive shaft 32 coupled in rotation with the motor 20. The main ground rollers 30 may also have a main wheel 31 mounted, preferably fixedly, on the motor shaft 32. It is therefore understood that the motor shaft 32 and the main wheel 31 are movable relative to the chassis 11 between the high position PH and the low position PB. The motor shaft 32 can extend along an axis of rotation Ar, preferably along the transverse direction Dt. The main wheel 31 may be driven in rotation about the axis of rotation Ar. The axis of rotation Ar may coincide with an axis of revolution of the main wheel 31.

The main ground rollers 30 can be mounted on the support 51 via the motor shaft 32. To this end, the motor shaft 32 can be mounted so as to rotate freely on the support 51. Thus, a movement of the motor shaft 32 between the high position PH and the low position PB can cause a movement of the support 51 between the first position P1 and the second position P2.

The motor shaft 32 may be engaged with an output shaft of the motor 20, either directly or indirectly via a gearbox or a transmission element (for example an Oldham joint). As such, the motor 20 may be movable relative to the chassis 11 between a high position PH and a low position PB which coincide with the high and low positions of the main ground rollers 30.

Figure 4:
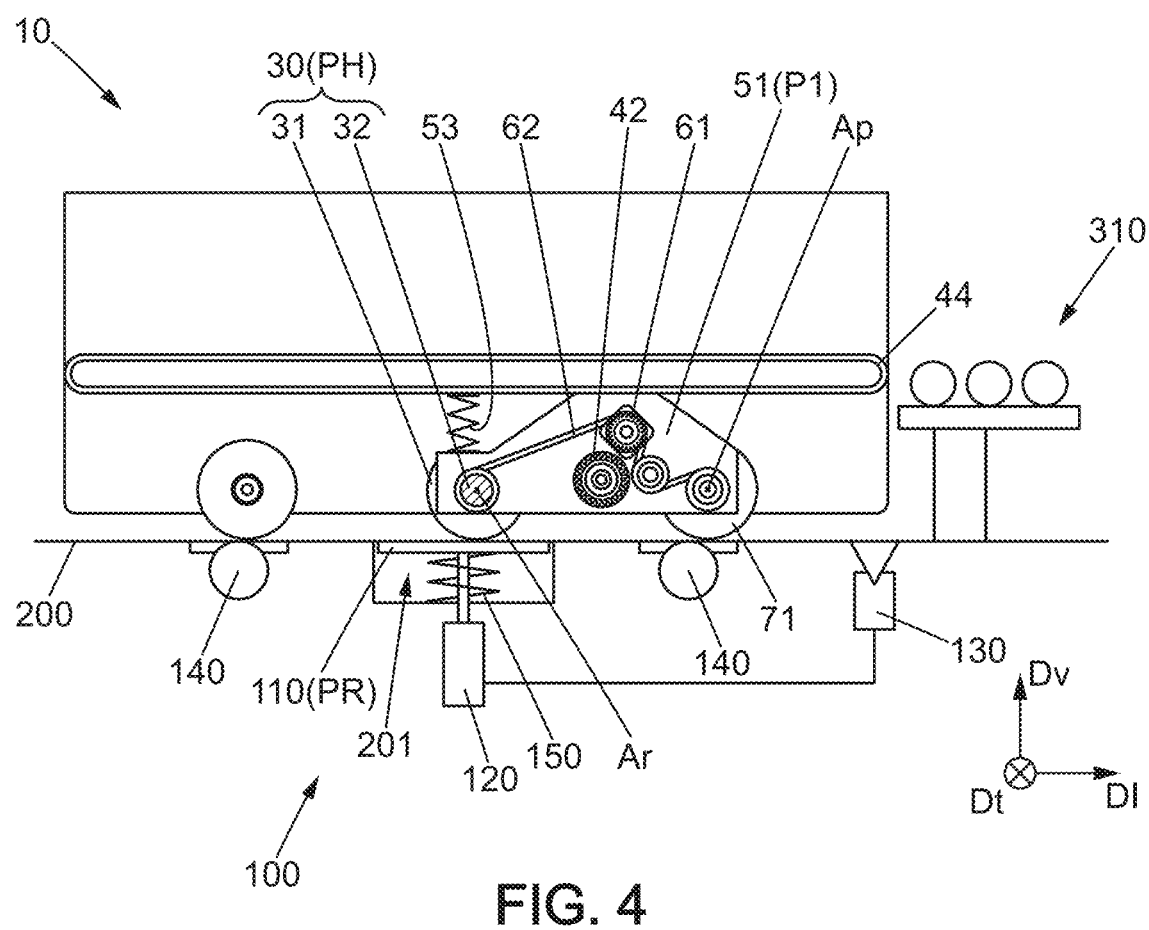
FIG. 4 represents a schematic side view of the vehicle shown in FIGS. 1 and 2 and of an actuating device for an automated article storage and retrieval system according to a first embodiment, in a disengaged configuration.
Figure 6:
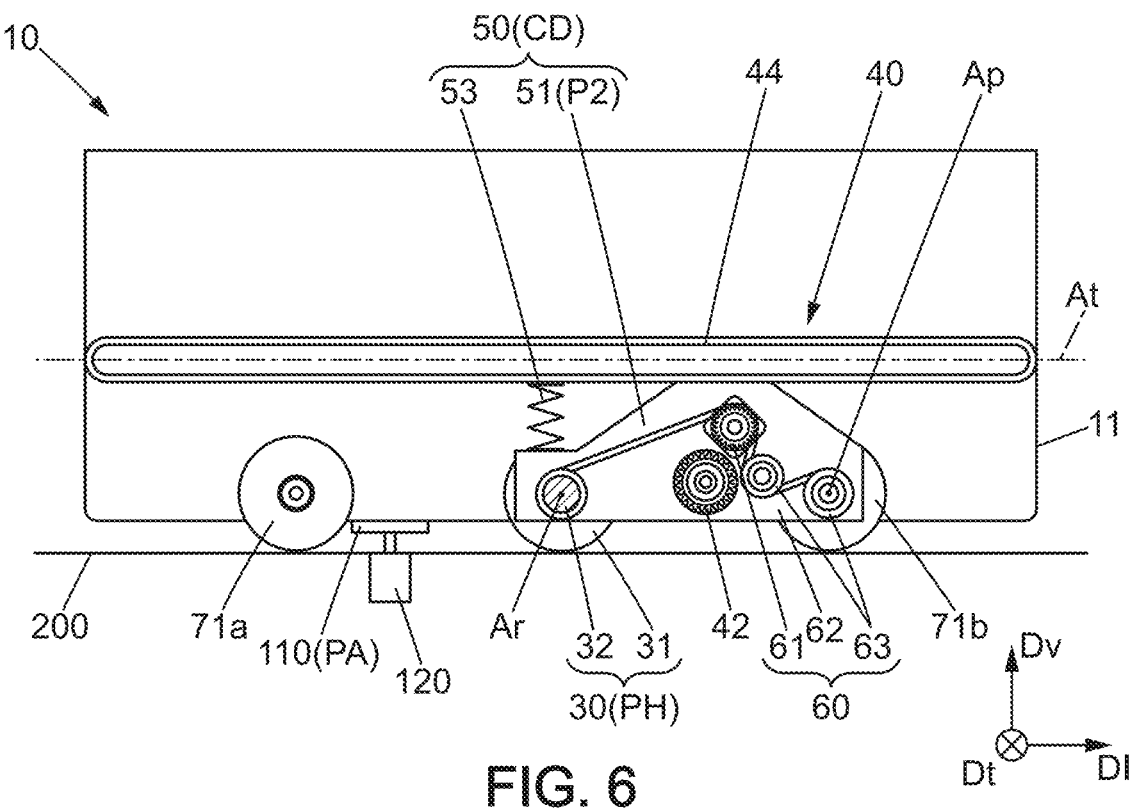
FIG. 6 shows a schematic side view of the vehicle shown in FIGS. 1 and 2 and of an actuating device for an automated article storage and retrieval system according to a second embodiment, in a disengaged configuration.

As shown in FIGS. 4 and 6, the main ground rollers 30 of each vehicle 10 can be maintained in their high position PH when the vehicle 10 is fully supported by the rolling surface 200 via the main ground rollers 30. In particular, the main ground rollers 30 of each vehicle 10 may be capable of being held in their high position PH when the vehicle 10 is fully supported by the running surface 200, and in particular by a reaction force resulting from the main ground rollers 30 bearing on the running surface 200. In particular, the main ground rollers 30 may bear on the running surface 200 via the main wheel 31.

Figure 5:
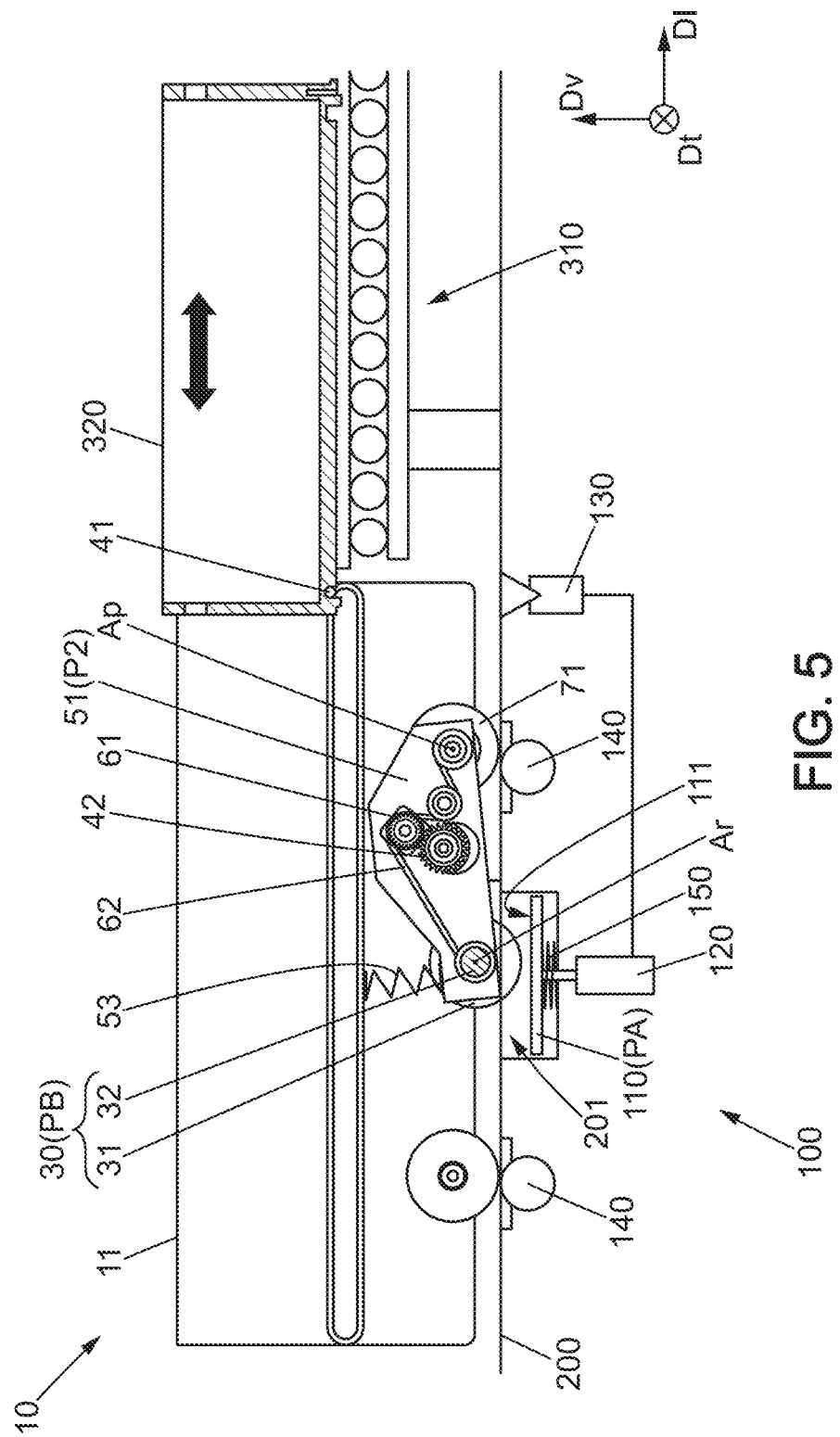
FIG. 5 shows a schematic side view of the vehicle shown in FIGS. 1 and 2 and of an actuating device for an automated article storage and retrieval system according to a first embodiment, in an engaged configuration.
Figure 7:
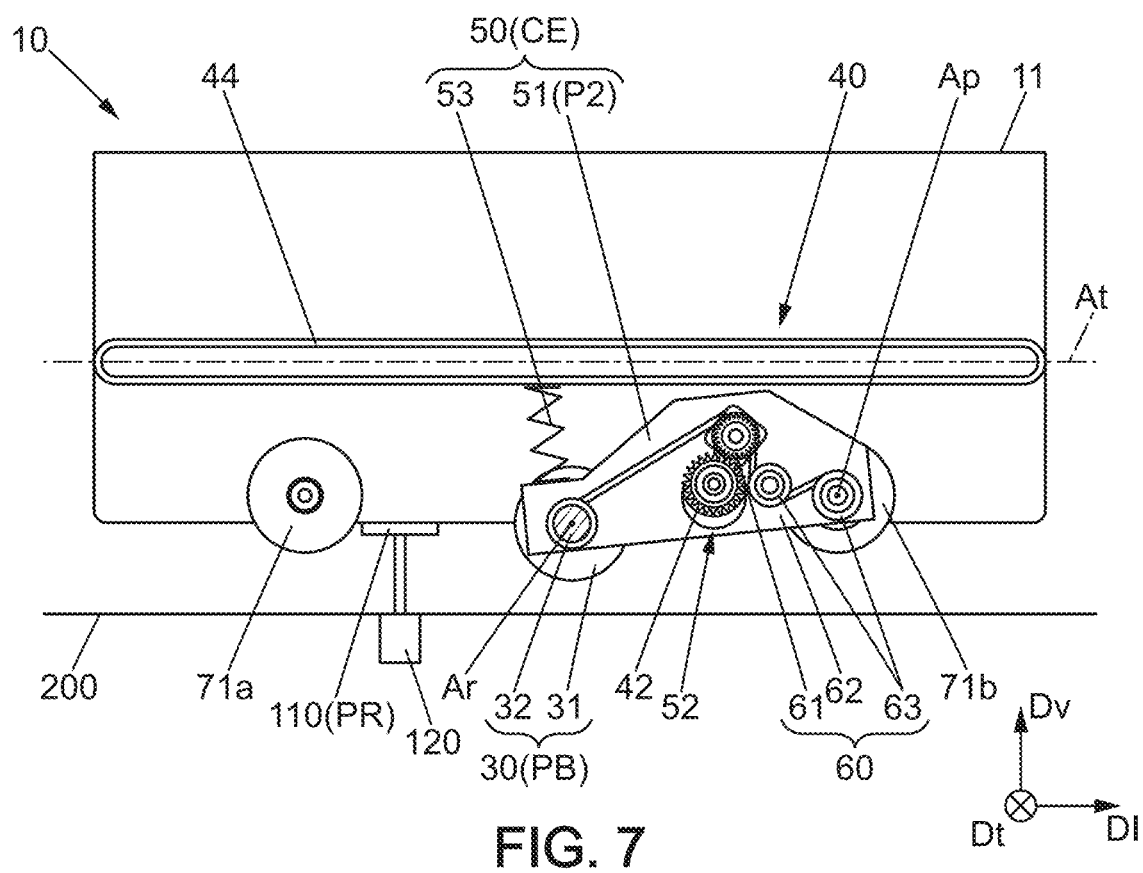
FIG. 7 shows a schematic side view of the vehicle shown in FIGS. 1 and 2 and of an actuating device for an automated article storage and retrieval system according to a second embodiment, in an engaged configuration.

In addition, as can be seen in FIGS. 5 and 7, each actuating device 100 is configured to remove the support for the vehicle 10 by the main ground rollers 30 and to allow the main ground rollers 30 to be moved into its low PB position at least under its own weight. In this case, the vehicle support is moved to a point on the vehicle other than the main ground rollers 30. Expressed differently, each actuator 100 is configured to release the main ground rollers 30 from the vehicle support to allow them to move, at least under their own weight, to the lowered position PB. In this way, each actuating device 100 can be configured to reduce, or even eliminate, the reaction force resulting from the main ground rollers 30 bearing on the rolling surface 200 in order to allow the main ground rollers 30 to move to their lower position PB under their own weight.

Optionally, the clutch mechanism 50 of each vehicle 10 may have a thrust member 53 configured to bias the support 51 towards the second position P2 and/or the main ground rollers 30 towards the low position PB when the support 51 of the vehicle 10 by the main ground rollers 30 is removed by one of said one or more actuating devices 100. By incorporating a biasing member 53, such as a compressed spring, to bias the support 51 to the second position P2 or the main ground rollers 30 to the lower position PB, the system allows efficient switching between the engaged and disengaged configurations of the clutch mechanism 50. This ensures that the support 51 is automatically moved when the vehicle 10 is no longer supported by the main ground rollers 30, thus optimising the loading and unloading process without the need for manual intervention or additional complex mechanisms. The member may have a compressed spring exerting a thrust force on the support 51 to urge it towards the second position P2. The spring may be compressed between the frame 11 and the support 51. The spring may be of the helical type. In alternative embodiments, alternatively or in addition, the thrust member may have at least one of a torsion spring, a gas spring, a jack. (hydraulic or pneumatic), a linear motor, a worm screw actuator or a magnetic actuator.

The transfer mechanism 40 of each vehicle 10 may have a first driven pinion 42. The first driven gear 42 may be rotatably mounted on the chassis 11. The power transmission 60 may have a drive pinion 61 rotatably mounted on the support 51 of the clutch mechanism 50. In the first position P1 of the support 51, the drive pinion 61 may be spaced from the first driven pinion 42, and in the second position P2 of the support 51, the drive pinion 61 meshes with the first driven pinion 42. In other words, the first driven pinion 42 and the driving pinion 61 can be engaged with each other in the engaged configuration CE. In the disengaged configuration CD, the first driven pinion 42 may be at a distance from the driving pinion 61. In this sense, the driving pinion 61 and the first driven pinion 42 may be disengaged from each other in the disengaged configuration CD. The drive gear 61 and the first driven gear 42 may each be rotatably mounted about a respective transverse axis.

The power transmission 60 may have a belt 62. The drive pinion 61 may be connected to the motor shaft 32 by the motor 20 and by the belt 62. The belt 62 of the power transmission 60 may be directly engaged with the motor shaft 32.

The power transmission 60 may have one or more tension rollers 63 configured to tension the belt 62. Each tension roller 63 may be rotatably mounted on the support 51. One of said one or more tension rollers 63 may be rotatably mounted about the pivot axis Ap.

The transfer mechanism 40 may have at least one gripper 41, such as a pin or a finger, configured to cooperate with the receptacle to be loaded or unloaded from the vehicle 10, and in particular configured to cooperate with a groove in the receptacle. The first driven pinion 42 may be coupled to the gripper 41 to generate a displacement of the gripper 41. The gripper 41 can be moved along the transfer axis At to load a receptacle onto the vehicle 10 (i.e. in direction S1) and/or unload a receptacle from the vehicle 10 (i.e. in direction S2). The transfer axis At can extend in the longitudinal direction Dl of the vehicle 10.

The transfer mechanism 40 may have a continuously driven transmission element 44, such as a chain or belt, rotated by the first driven sprocket 42. The gripper 41 may be integral with the continuously driven transmission element 44. The continuous drive transmission element 44 can mesh with a second driven pinion 43, visible in FIG. 3, which is fixed in rotation to the first driven pinion 42. The first driven gear 42 and the second driven gear 43 may be connected by a shaft.

To load a receptacle onto the vehicle 10 and/or unload a receptacle from the vehicle 10, the continuous drive transmission element 44 can be rotated to move the gripper 41 in a first direction of loading a receptacle onto the vehicle 10 or in a second direction (opposite to the first direction) of unloading the receptacle from the vehicle 10. The continuous drive transmission element 44 can be rotated by the motor 20 via the first driven gear 42 meshing with the driving gear 61 in the engaged configuration CE. As a vehicle 10 approaches a location to retrieve a receptacle, the continuous drive transmission element 44 can move the gripper 41 into engagement with the receptacle. In the case of a groove under the container, vertical displacement of the vehicle 10 may be required to engage the gripper 41 in the groove. The continuous drive transmission element 44 then reverses its direction of rotation to pull the container onto the vehicle 10. To unload a container, the process is reversed.

The support 51 has an inner side and an outer side in the transverse direction Dt. The drive pinion 61 and the first driven pinion 42 can be arranged on the outside of the support 51. Similarly, the belt 62, and possibly the tension rollers 63, can be arranged on the outside of the support 51.

the second driven gear 43 meshing with the continuous drive transmission element 44 may be disposed on the inside of the support 51. The support 51 may have a hole 52 through which the shaft connecting the first driven gear 42 and the second driven gear 43 extends. The edges of the hole 52 through the support 51 may form abutment elements of the support 51 on the shaft, in the first position P1 and/or in the second position P2 of the support 51.

Each vehicle 10 may have secondary ground rollers 70 for moving the vehicle 10 over the rolling surface. The secondary ground rollers 70 may have one or more secondary wheels 71 configured to roll on the rolling surface 200. At least one, and possibly each, of said one or more secondary wheels 71 of the secondary ground rollers 70 may be of the omnidirectional type.

Said one or more secondary wheels 71 of the secondary ground rollers may have a front secondary wheel 71a and a rear secondary wheel 71b. The front secondary wheel 71a and the rear secondary wheel 71b may be arranged on either side of the main ground rollers 30 in the longitudinal direction Dl. In other words, the main ground rollers 30 can be arranged between the front secondary wheel 71a and the rear secondary wheel 71b in the longitudinal direction Dl.

Each secondary wheel 71 of the secondary ground rollers 70 may be mounted so as to be rotatable relative to the chassis 11 about a respective axis which preferably extends in the transverse direction Dt. The axis of the rear secondary wheel 71b may coincide with the pivot axis Ap of the support 51.

The rear secondary wheel 71b of the secondary ground rollers 70 can be fixedly mounted on a shaft which is integral with one of the said tension rollers 63 of the power transmission 60. Thus, the rear secondary wheel 71b and the corresponding shaft can be driven in rotation by the belt 62 and therefore by the motor 20. In particular, the shaft on which the rear secondary wheel 71b is mounted may be integral with the tension roller 63 which is rotatable about the pivot axis Ap of the support 51. Similarly, it may be provided that the front secondary wheel 71a is rotated by the motor 20. Alternatively, one or more, or even each, of said one or more secondary wheels 71 of the secondary ground rollers 70 may be driven by a respective secondary motor.

Each actuating device 100 may also have a sensor 130 configured to detect the presence in proximity of a vehicle 10 among said one or more vehicles 10, in particular to detect the presence in proximity of a vehicle 10 capable of cooperating with the actuating device 100. The sensor 130 may be an optical sensor, for example configured to emit light and/or laser beams in order to identify the position and proximity of the vehicles. This type of sensor offers high accuracy and speed of detection, enabling effective interaction with the actuation device. Optical sensors are also less sensitive to electromagnetic interference, improving the reliability of the system in a variety of warehouse environments. In this way, the actuator can be activated after detecting a vehicle in a position suitable for cooperation.

A first embodiment of the said one or more actuating devices is now described in more detail, with reference to FIGS. 4 and 5.

Each actuator device 100 may have a platform 110 received in a respective recess 201 formed in the rolling surface 200. The platform 110 may be movable relative to the rolling surface 200 between:—
  a raised position PR in which the platform 110 is flush with the rolling surface 200 and able to hold the main ground rollers 30 of one of the said one or more vehicles 10 in the raised position PH, and
  a lowered position PA in which the main ground rollers 30 of one of the said one or more vehicles 10 can be, in whole or in part, inserted into the associated recess 201 by displacement into their lowered position PB from the raised position PH.

This allows the clutch mechanism 50 to be switched between the engaged CE and disengaged configurations without requiring any vertical movement of the vehicle 10, thereby optimising cycle time for loading and unloading the receptacles. This configuration also allows flexible integration into a variety of warehouse environments, maximising the use of available space.

In the raised position PR, a reaction force resulting from the support of the main ground rollers 30 on the platform 110 may be able to maintain the main ground rollers 30 in their raised position PH. The upper surface 111 of the platform 110 may be suitable for rolling the main wheel 31. In the raised position PR, the rolling surface 200 may have the upper face 111 of the platform 110 of each of said one or more actuating devices 100.

The platform 110 can be moved in the vertical direction Dv between the raised position PR and the lowered position PA.

Each actuation device 100 may have an actuator 120 for moving the platform 110 at least from the raised position PR to the lowered position PA, and preferably from the lowered position PA to the raised position PR. The actuator 120 may be of the linear type, such as an electric or hydraulic cylinder. The actuator 120 may have a motor, preferably electric.

Optionally, each actuating device 100 may have a return member 150 configured to exert a return force on the platform 110 in the direction of the raised position PR. This ensures that the platform is held in the raised position, particularly when a vehicle passes over it. The return member 150 may be a spring compressed between the platform 110 and a bottom wall of the associated recess 201 in the running surface 200.

The sensor 130 can be configured to detect the presence of a vehicle 10 among said one or more vehicles 10 whose main ground rollers 30 are vertically above, or even on, the platform 110.

Each actuation device 100 may have one or more rolling zones 140 each configured to allow rotation of one of the secondary wheels 71, without moving the vehicle 10 relative to the running surface 200. The rolling zones 140 allow the wheels of the secondary ground rollers 70 to rotate freely without moving the vehicle 10. This enables the transfer mechanism to be activated without causing any involuntary movement of the vehicle 10, thus optimising the loading and unloading process. It also improves the accuracy of operations by keeping the vehicle 10 stable during item transfers.

The secondary wheel 71 of each secondary ground rollers 70 may be in contact with one of said one or more rolling zones 140 when the vehicle 10 is cooperating with the actuating device 100. Also, when one of the vehicles 10 is cooperating with one of the actuating devices 100, each secondary wheel 71 may be arranged on a rolling zone 140.

Each rolling zone 140 may have at least one roller, preferably a pair of rollers, free to rotate relative to the rolling surface 200. Each rolling zone 140 may be flush with the rolling surface 200.

A second embodiment of the said one or more actuating devices is now described in more detail, with reference to FIGS. 6 and 7.

Each actuator 100 may be configured to raise the chassis 11 of one of said one or more vehicles 10 to remove the support of the vehicle 10 by the main ground rollers 30 to allow movement of the main ground rollers 30 into its lowered position PB. In other words, each actuation device 100 is configured to raise the vehicle 10 relative to the rolling surface 200. The vehicle support is moved to the chassis lifting point by the actuating device. In this way, each actuating device 100 is configured to release the main ground rollers 30 from the vehicle support and allow them to move, at least under their own weight, towards the lowered position PB. This second method is advantageous when the main ground rollers fully support the weight of the vehicle on the rolling surface.

To this end, each actuator 100 may have an arm adapted to raise the chassis 11 of the vehicle 10.

Each actuating device may have a platform movable relative to the rolling surface 200 between a raised position PR in which the platform 110 is able to raise and fully support one of said one or more vehicles at chassis level in order to allow movement of the main ground rollers into their lowered position, and a lowered position PA in which each vehicle can travel above the platform. The platform 110 can be moved in the vertical direction Dv between the raised position PR and the lowered position PA. In the lowered position, which the platform 110 may be flush with the running surface 200. In particular, the running surface 200 may have the upper face 111 of the platform 110 of each actuation device 100 in the lowered position.

Each device may have an actuator 120 configured to operate the arm or platform to lift the vehicle 10. The actuator 120 may be of a linear type, such as an electric or hydraulic cylinder. The actuator 120 may have a motor, preferably electric.

Figure 8:
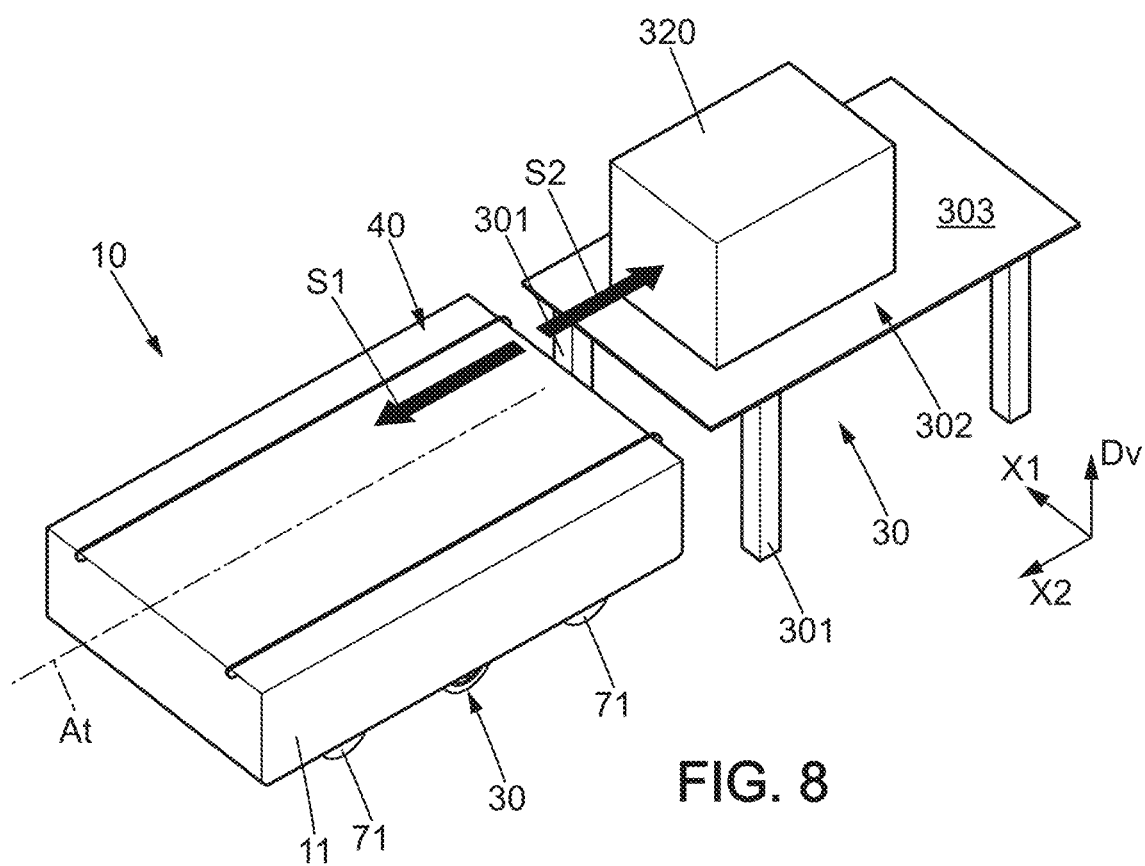
FIG. 8 shows a schematic view of the transfer of a receptacle between a storage rack and the vehicle of FIGS. 1 and 2 in an automated article storage and retrieval system.

With reference to FIG. 8, the automated article storage and retrieval system may have one or more storage racks 300 each having a plurality of uprights 301 aligned along a first horizontal direction X1. Each upright 301 may have a climbing support extending in the vertical direction Dv. Each upright 301 may have a vertical post to which the climbing support is fixed.

Each rack 300 may be adapted to store items. Each rack 300 may have a column between each pair of consecutive uprights 301. The column may have a plurality of levels arranged vertically between a lower level 302 and an upper level. The lower level 302 may be vertical to the rolling surface 200. Each level may have a plurality of storage locations 303 (or "cells"). Each storage location 303 can therefore be delimited by two consecutive uprights 301 in the first horizontal direction X1. Each storage location 303 can accommodate one or more items, preferably in a receptacle such as a tray or bin.

More generally, the article storage and retrieval system may have a plurality of racks 300 spaced apart along a second horizontal direction X2, preferably perpendicular to the first horizontal direction X1. The article storage and retrieval system has a plurality of aisles extending in the first direction between each pair of consecutive racks 300. The rolling surface 200 may have each aisle.

Each vehicle 10 may have one or more climbing mechanisms configured to move the vehicle 10 along a respective vertical upright 301. Each climbing mechanism may be adapted to mate with a complementary climbing support extending along the respective upright 301. In particular, each climbing mechanism may have a toothed wheel adapted to mate with a complementary rack or chain extending along the respective upright 301.

For at least one of the racks 300, an actuation device 100 can be arranged on at least one of the columns, or even on each of the columns. In this way, the actuating device arranged at the level of the column is able to move the clutch mechanism 50 of a vehicle 10 near the column from the disengaged configuration CD to the engaged configuration CE, and consequently the transfer mechanism 40 of the vehicle can be able to load a receptacle onto the vehicle 10 from the lower level 302 of the column or unload a receptacle from the vehicle 10 to store it on the lower level 302 of the column.

Loading a container onto the vehicle 10 from the lower level 302 and/or unloading a container from the vehicle 10 for storage in the lower level 302 can be carried out without the climbing mechanisms cooperating with the vertical uprights 301 of the rack 300, in particular the uprights 301 delimiting the column.

The actuating device 100 associated with a column may be at the level of the aisle serving the column, preferably opposite the column in the second horizontal direction X2.

Alternatively or in addition to the storage racks, the automated article storage and retrieval system may have at least one conveyor 310 accessible by said one or more vehicles 10 travelling on the rolling surface 200. Such a conveyor is shown in FIGS. 4 and 5. At least one of said one or more actuators 100 may be disposed proximate the conveyor 310 to shift the clutch mechanism 50 of one of said one or more vehicles 10 from the disengaged configuration CD to the engaged configuration CE in order to load a receptacle onto the vehicle 10 from the conveyor 310 and/or unload a receptacle from the vehicle 10 onto the conveyor 310, via the transfer mechanism 40 of the vehicle 10.

Figure 2:
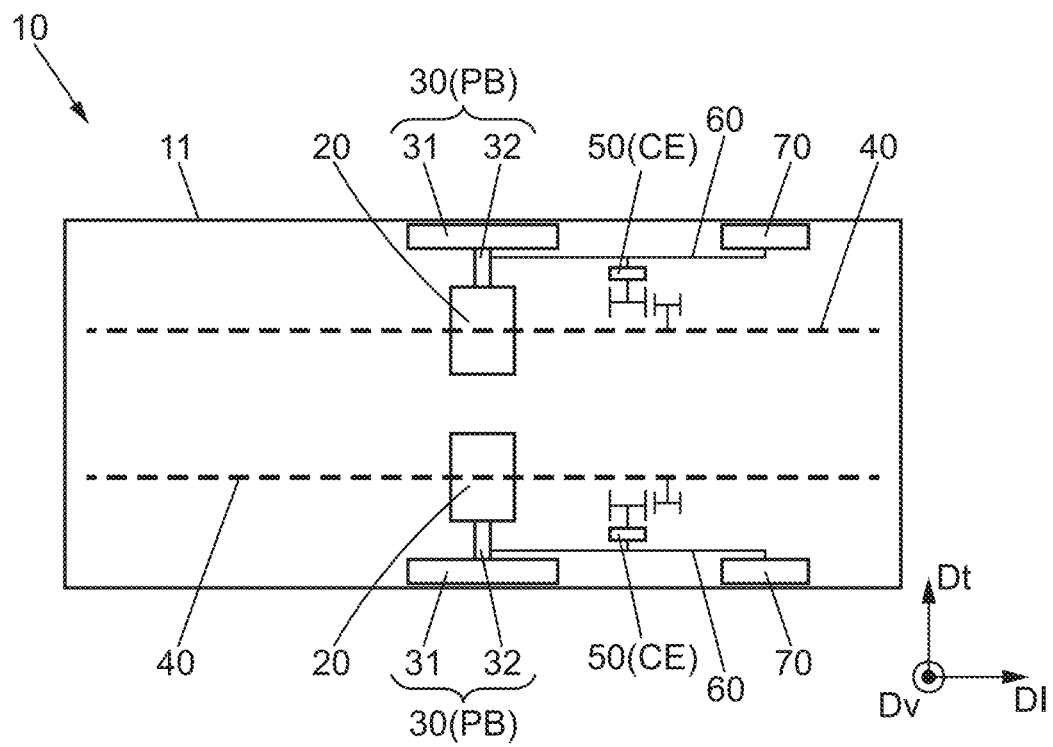
FIG. 2 represents a schematic top view of the vehicle for an automated article storage and retrieval system, in which the clutch mechanism disengages transfer mechanism with a power transmission of an engine intended for driving.
Figure 3:
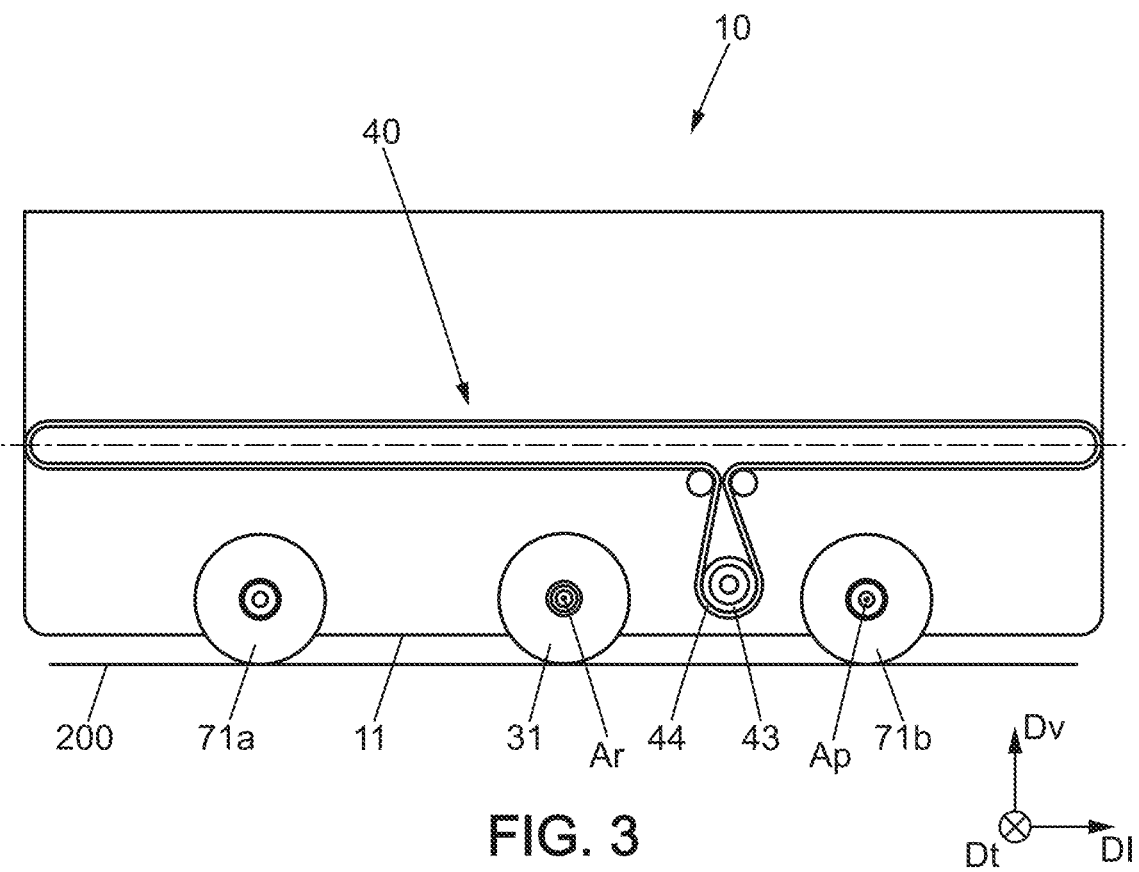
FIG. 3 shows a schematic cross-section of the vehicle shown in FIGS. 1 and 2.

Generally speaking, as shown in FIGS. 1 and 2, and without contradicting the above description, each vehicle 10 may have:
- at least a first engine 20 and a second engine 20,
- first main ground rollers 30 and second main ground rollers 30 configured to be driven respectively by the first motor 20 and the second motor 20 in order to move the vehicle 10 on the running surface 200,
- a first transfer mechanism 40 and second transfer mechanism 40 configured to load a receptacle onto the vehicle 10 and/or unload a receptacle from the vehicle 10,
- a first clutch mechanism 50 having an engaged configuration CE in which the first clutch mechanism 50 engages a first power transmission 60 from the first engine 20 to the first transfer mechanism 40, and a disengaged configuration CD in which the first clutch mechanism 50 disengages the first power transmission 60 from the first engine 20 to the first transfer mechanism 40,
- a second clutch mechanism 50 having an engaged configuration CE in which the second clutch mechanism 50 engages a second power transmission 60 from the second engine 20 to the second transfer mechanism 40, and a disengaged configuration CD in which the second clutch mechanism 50 disengages the second power transmission 60 from the second engine 20 to the second transfer mechanism 40.

Each actuator device 100 being configured to cooperate with one of said one or more vehicles 10 to switch the first clutch mechanism 50 and the second clutch mechanism 50 between their respective engaged CE and disengaged CD configurations.

The designation above of the engine 20, the main ground rollers 30, the transfer mechanism 40 and the clutch mechanism 50 by the adjectives "first" and "second" results from a choice intended to distinguish them in the case where the vehicle may have two elements of each of them. These may include, in whole or in part, the characteristics described above with respect to the same elements designated without the qualification "first" or "second".

As can be seen in FIGS. 1 and 2, the first motor 20 and the second motor 20 may be on either side of the vehicle 10 in the transverse direction Dt. The first motor 20 and the second motor 20 may be symmetrical with respect to a median longitudinal plane of the vehicle 10. The same may apply to:
- the first main ground rollers 30 and the second main ground rollers 30, and/or
- the first transfer mechanism 40 and the second transfer mechanism 40, and/or
- the first clutch mechanism 50 and the second clutch mechanism 50.

According to another aspect, a method is described for storing and/or preparing an order by means of an automated article storage and retrieval system as described above. The method may include the following steps:
- Moving one of said one or more vehicles 10 on the rolling surface 200 by means of the main ground rollers 30 driven by the motor 20 to a transfer zone, the transfer zone having one of said one or more actuating devices 100, the mechanism being in the disengaged configuration CD during the movement of the vehicle 10,
- Bringing the vehicle 10 into co-operation with the actuating device 100
- Activating the actuating device 100 to move the clutch mechanism 50 of the vehicle 10 into the engaged configuration CE
- Loading a receptacle onto the vehicle 10 from the transfer zone by means of the transfer mechanism 40 driven by the engine 20, and/or unloading a receptacle from the vehicle 10 to the transfer zone by means of the transfer mechanism 40 driven by the engine 20.

The transfer zone may have a rack 300 as described above or a conveyor 310 as described above.

In the case of the first embodiment, actuation of the actuation device 100 may include moving the platform 110 from the raised position PR to the lowered position PA to cause the main ground rollers 30 to move to their lowered position PB in the associated recess 201 of the rolling surface 200.

In the case of the first embodiment, actuation of the actuation device 100 may include raising the vehicle 10 relative to the running surface 200 to allow movement of the main ground rollers 30 into their lowered position PB. In particular, actuation of the actuation device 100 may involve moving the platform 110 from the lowered position PA to the raised position PR to cause the main ground rollers 30 to move to their lowered position PB.

The invention is not limited to the examples described above and is open to numerous variations.

In a variant not shown, the support 51 can be mounted so as to slide relative to the chassis 11, preferably in the vertical direction Dv. To this end, a slide assembly may be provided between the support 51 and the chassis 11.

In a variant not shown, each actuating device 100 can cooperate directly with the support 51 of the clutch mechanism 50 in order to move it between the first position P1 and the second position P2.

An automated article storage and retrieval system may also be provided having actuating devices of several types, for example actuating devices according to the first embodiment and other actuating devices according to the second embodiment.

The invention claimed is:

1. An automated article storage and retrieval system comprising at least one rolling surface and one or more vehicles each comprising:
   at least one motor,
   main ground rollers configured to be driven by the motor to move the vehicle on the at least one rolling surface, a transfer mechanism configured to load a receptacle onto the vehicle and/or unload a receptacle from the vehicle, a clutch mechanism having an engaged configuration in which the clutch mechanism engages a transmission of power from the at least one motor to the transfer mechanism, and a disengaged configuration in which the clutch mechanism disengages the power transmission from the at least one motor to the transfer mechanism, wherein the automated article storage and retrieval system comprises one or more motorised actuating devices at the rolling surface, each actuating device being configured to cooperate with one of the said one or more vehicles in order to switch the clutch mechanism between the engaged configuration and the disengaged configuration.

2. An automated article storage and retrieval system according to claim 1, wherein each vehicle comprises a chassis, the clutch mechanism comprising a support mounted on the chassis movably between a first position in the disengaged configuration and a second position in the engaged configuration, and wherein each actuator is configured to cause movement of the support of one of said one or more vehicles between the first position and the second position in order to move the clutch mechanism between the engaged configuration and the disengaged configuration.

3. An automated article storage and retrieval system according to claim 2, in which the support is mounted so as to pivot relative to the chassis about a pivot axis.

4. An automated article storage and retrieval system according to claim 2, wherein the main ground rollers of each vehicle are mounted on the support, so that the main ground rollers are movable relative to the chassis between a high position which coincides with the first position of the support and a low position which coincides with the second position of the support, and wherein each actuating device is configured to cause a displacement of the support between the first position and the second position via a displacement of the main ground rollers between the high position and the low position.

5. An automated article storage and retrieval system according to claim 4, in which the main ground rollers of each vehicle are maintained in their high position when the vehicle is entirely supported by the rolling surface via the main ground rollers, and in which each actuating device is configured to eliminate support of the vehicle by the main ground rollers and to allow movement of the main ground rollers into their lower position at least under their own weight.

6. An automated article storage and retrieval system according to claim 5, wherein the clutch mechanism of each vehicle comprises a thrust member configured to urge the support towards the second position and/or the main ground rollers towards the lower position when the support of the vehicle by the main ground rollers is removed by one of said one or more actuating devices.

7. An automated article storage and retrieval system according to claim 5, wherein each actuating device comprises a platform received in a respective recess in the rolling surface, the platform being movable relative to the rolling surface between:

a raised position in which the platform is flush with the rolling surface and able to hold the main ground rollers of one of said one or more vehicles in the raised position, and a lowered position in which the main ground rollers of one of the said one or more vehicles can be at least partially inserted into the associated recess by displacement into their lowered position, from the raised position.

8. An automated article storage and retrieval system according to claim 7, wherein each actuator comprises an actuator configured to move the platform at least from the raised position to the lowered position.

9. An automated article storage and retrieval system according to claim 7, wherein each actuator comprises a biasing member configured to exert a biasing force on the platform towards the raised position.

10. An automated article storage and retrieval system according to claim 8, wherein each actuating device comprises a sensor configured to detect the presence in the vicinity of one vehicle of said one or more vehicles, wherein the sensor is configured to detect the presence in the vicinity of one vehicle of said one or more vehicles, the main ground rollers of which are vertically above the platform.

11. An automated article storage and retrieval system according to claim 7, wherein each vehicle comprises secondary ground rollers comprising one or more secondary wheels configured to roll on the rolling surface, and wherein each actuator device comprises one or more rolling zones, each configured to allow rotation of one of said one or more secondary wheels, without displacement of the vehicle relative to the rolling surface.

12. An automated article storage and retrieval system according to claim 5, wherein each actuator is configured to raise the chassis of one of said one or more vehicles to remove support from the vehicle by the main ground rollers to allow movement of the main ground rollers into its lowered position.

13. An automated article storage and retrieval system according to claim 1, wherein each actuating device comprises a sensor configured to detect the presence in the vicinity of one vehicle of said one or more vehicles.

14. An automated article storage and retrieval system according to claim 2, wherein the transfer mechanism comprises a first driven gear and the power transmission comprises a drive gear rotatably mounted on the support of the clutch mechanism, and wherein, in the first position of the support, the drive gear is spaced from the first driven gear, and in the second position of the support, the drive gear meshes with the first driven gear.

15. An automated system for storing and retrieving items according to claim 1, which comprises at least one storage rack each comprising a plurality of uprights aligned along a first horizontal direction and delimiting a column between each pair of consecutive uprights, each column comprising at least one lower level which includes a storage location adapted to receive a receptacle, and wherein one actuating device of said one or more actuating devices is arranged at at least one of the columns, the rack for transferring the clutch mechanism of one of said one or more vehicles from the disengaged configuration to the engaged configuration and loading a receptacle onto the vehicle from the lower level of the column and/or unloading a receptacle from the vehicle into the lower level of the column, by the transfer mechanism.

16. An automated article storage and retrieval system according to claim 15, which comprises a plurality of storage racks spaced apart along a second horizontal direction, comprising a plurality of aisles extending in the first horizontal direction between each pair of consecutive racks, the rolling surface comprising each of the aisles, and
in which each actuating device associated with a column is disposed at the level of the aisle serving said column.

17. An automated article storage and retrieval system according to claim 1, which comprises at least one conveyor accessible by said one or more vehicles travelling on the rolling surface, and wherein at least one of said one or more actuating devices is disposed in proximity to the conveyor for shifting the clutch mechanism of one of said one or more vehicles from the disengaged configuration to the engaged configuration in order to load a receptacle onto the vehicle from the conveyor and/or unload a receptacle from the vehicle onto the conveyor, by the transfer mechanism of the vehicle.

18. A method of storage and/or order picking by means of an automated article storage and retrieval system, the automated article storage and retrieval system comprising at least one rolling surface and one or more vehicles each comprising:
at least one motor,
main ground rollers configured to be driven by the motor to move the vehicle on the at least one rolling surface,
a transfer mechanism configured to load a receptacle onto the vehicle and/or unload a receptacle from the vehicle,
a clutch mechanism having an engaged configuration in which the clutch mechanism engages a transmission of power from the at least one motor to the transfer mechanism, and a disengaged configuration in which the clutch mechanism disengages the power transmission from the at least one motor to the transfer mechanism,
wherein the automated article storage and retrieval system comprises one or more motorised actuating devices at the rolling surface, each actuating device being configured to cooperate with one of the said one or more vehicles in order to switch the clutch mechanism between the engaged configuration and the disengaged configuration,
wherein the method comprises:
Moving one of said one or more vehicles on the rolling surface, by using the main ground rollers driven by the at least one motor, to a transfer zone, the transfer zone comprising one of said one or more actuating devices, the mechanism being in the disengaged configuration during the movement of the vehicle,
Bringing the vehicle into cooperation with the actuating device,
actuating the actuating device to move the clutch mechanism of the vehicle into the engaged configuration,
loading a receptacle onto the vehicle from the transfer area using the transfer mechanism driven by the at least one motor, and/or unloading a receptacle from the vehicle to the transfer area using the transfer mechanism driven by the at least one motor.

19. A method according to claim 18, wherein each actuating device comprises a platform received in a respective recess in the rolling surface, the platform being movable relative to the rolling surface between a raised position in which the platform is flush with the running surface and able to hold the main ground rollers of one of said one or more vehicles in the raised position, and a lowered position in which the main ground rollers of one of the said one or more vehicles can be at least partially inserted into the associated recess by displacement into their lowered position, from the raised position,
wherein actuation of the actuation device comprises moving the platform from the raised position to the lowered position to cause the main ground rollers to move into its lowered position in the associated recess of the rolling surface.

20. A method according to claim 18, wherein each vehicle comprises a chassis, the clutch mechanism comprising a support mounted on the chassis movably between a first position in the disengaged configuration and a second position in the engaged configuration, wherein each actuator is configured to cause movement of the support of one of said one or more vehicles between the first position and the second position in order to move the clutch mechanism between the engaged configuration and the disengaged configuration,
wherein each actuating device comprises a platform received in a respective recess in the rolling surface, the platform being movable relative to the rolling surface between a raised position in which the platform is flush with the running surface and able to hold the main ground rollers of one of said one or more vehicles in the raised position, and a lowered position in which the main ground rollers of one of the said one or more vehicles can be at least partially inserted into the associated recess by displacement into their lowered position, from the raised position,
wherein each actuator is configured to raise the chassis of one of said one or more vehicles to remove support from the vehicle by the main ground rollers to allow movement of the main ground rollers into its lowered position,
wherein actuation of the actuation device comprises raising the vehicle relative to the rolling surface to allow movement of the main ground rollers into their lowered position.

* * * * *